US011283816B2

(12) United States Patent
Gilbert et al.

(10) Patent No.: US 11,283,816 B2
(45) Date of Patent: Mar. 22, 2022

(54) HIERARCHICAL SCANNING OF INTERNET CONNECTED ASSETS

(71) Applicant: Palo Alto Networks, Inc., Santa Clara, CA (US)

(72) Inventors: Connor Leete Gilbert, San Francisco, CA (US); Michael Haggblade, San Bruno, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

(21) Appl. No.: 16/579,302

(22) Filed: Sep. 23, 2019

(65) Prior Publication Data
US 2020/0092309 A1 Mar. 19, 2020

Related U.S. Application Data

(63) Continuation of application No. 15/136,620, filed on Apr. 22, 2016, now Pat. No. 10,425,430.

(51) Int. Cl.
*H04L 29/06* (2006.01)
*H04L 69/16* (2022.01)

(52) U.S. Cl.
CPC ...... *H04L 63/1416* (2013.01); *H04L 63/0236* (2013.01); *H04L 63/0245* (2013.01); *H04L 63/0428* (2013.01); *H04L 63/1433* (2013.01); *H04L 63/20* (2013.01); *H04L 63/205* (2013.01); *H04L 69/169* (2013.01)

(58) Field of Classification Search
None
See application file for complete search history.

(56) References Cited

U.S. PATENT DOCUMENTS

| 7,752,665 B1 | 7/2010 | Robertson et al. | |
|---|---|---|---|
| 9,413,783 B1 | 8/2016 | Keogh | |
| 2003/0191963 A1* | 10/2003 | Balissat | H04L 63/0209 726/12 |
| 2004/0199625 A1* | 10/2004 | Makino | H04L 29/06 709/223 |
| 2007/0130373 A1 | 6/2007 | Kalwitz | |
| 2010/0177650 A1 | 7/2010 | Wittgreffe | |
| 2011/0078237 A1* | 3/2011 | Nakamura | H04L 67/322 709/203 |
| 2013/0275575 A1 | 10/2013 | Hugard et al. | |

(Continued)

OTHER PUBLICATIONS

Zakir Durumeric, et al., "A search engine backed by Internet-wide scanning", Proceedings of the 22nd ACM SIGSAC Conference on Computer and Communications Security, ACM, 2015.
Graham, "masscan / src / proto-banner1.c", https://github.com/robertdavidgraham/masscan/blob/master/src/proto-banner1.c, Sep. 1, 2014.

(Continued)

*Primary Examiner* — Andrew J Steinle
(74) *Attorney, Agent, or Firm* — Gilliam IP PLLC

(57) ABSTRACT

Hierarchical scanning begins with communicating probes over the Internet to ports and networks addresses to determine publicly accessible devices. Based on responses to those probes, follow-up probes are determined to obtain additional information about the publicly accessible devices. The probes are transmitted from a system that is external to the networks corresponding to the network addresses. This provides an external view of the scanned networks and facilitates a probing paradigm that scales beyond a few networks.

18 Claims, 8 Drawing Sheets

(56) References Cited

U.S. PATENT DOCUMENTS

| | | | | |
|---|---|---|---|---|
| 2014/0067689 A1* | 3/2014 | Rogers | ............... | G06F 21/83 |
| | | | | 705/71 |
| 2014/0351573 A1* | 11/2014 | Martini | ............... | H04L 63/0254 |
| | | | | 713/153 |
| 2016/0057101 A1* | 2/2016 | Hugard, IV | .......... | H04L 63/105 |
| | | | | 709/220 |
| 2017/0353745 A1* | 12/2017 | Karkkainen | ..... | H04N 21/23476 |

OTHER PUBLICATIONS

Robert David Graham, "MASSCAN: Mass IP port scanner", URL: https://github.com/robertdavidgraham/masscan, Apr. 24, 2014.
Gordon Fyodor Lyon, "Technique Described", Nmap Network Scanning, Chapter 7, Jan. 1, 2009.
Gordon Fyodor Lyon, "Nmap API", Nmap Network Scanning, Chapter 9, Jan. 1, 2009.
Author Unknown, "Nmap Changelog", https:nmap.org/changelog. html#4.21ALPHA1, Nmap 4.21ALPHA1 entry dated Dec. 10, 2006.
Kris, "NSE re-categorization", highlighted text dated Jun. 20, 2008.
Zakir Durumeric, et al., "ZMap: Fast Internet-wide scanning and its security applications", Presented as part of the 22nd USENIX Security Symposium (USENIX Security 13), 2013.
Author Unknown, "Nmap Network Scanning", https://nmap.org/book/, Jan. 1, 2009.
Application No. PCT/US2017/016399 International Search Report, dated Apr. 13, 2017, 2 pages.
Application No. PCT/US2017/016399 Written Opinion, dated Apr. 13, 2017, 5 pages.

* cited by examiner

HIERARCHICAL SCANNING OF INTERNET CONNECTED ASSETS

CROSS-REFERENCE TO RELATED APPLICATIONS

This application is a continuation of co-pending U.S. patent application Ser. No. 15/136,620 filed Apr. 22, 2016, which is incorporated herein by reference in its entirety.

BACKGROUND OF THE INVENTION

Internet connected assets (e.g., computers, mobile devices, server systems, client systems, internet-of-things devices, etc.) comprise computing systems in communication with the Internet. Internet connected assets commonly include one or more publicly addressable communication ports, allowing any internet connected device to query the asset. Some devices allow a range of connection types (e.g., HTTP connections HTTPS connections, FTP connections, FTPS connections, telnet connections, SSH connections, etc.) over the one or more publicly accessible ports. Internet connected assets can comprise a wide range of different types of hardware devices running a wide range of software including a wide range of configuration options, creating a myriad of possibilities for security vulnerabilities. A typical systems administrator may not be aware of every detail of every system under his or her watch, creating a problem where system vulnerabilities may go undetected and unfixed.

BRIEF DESCRIPTION OF THE DRAWINGS

Various embodiments of the invention are disclosed in the following detailed description and the accompanying drawings.

DETAILED DESCRIPTION

Figure 1:
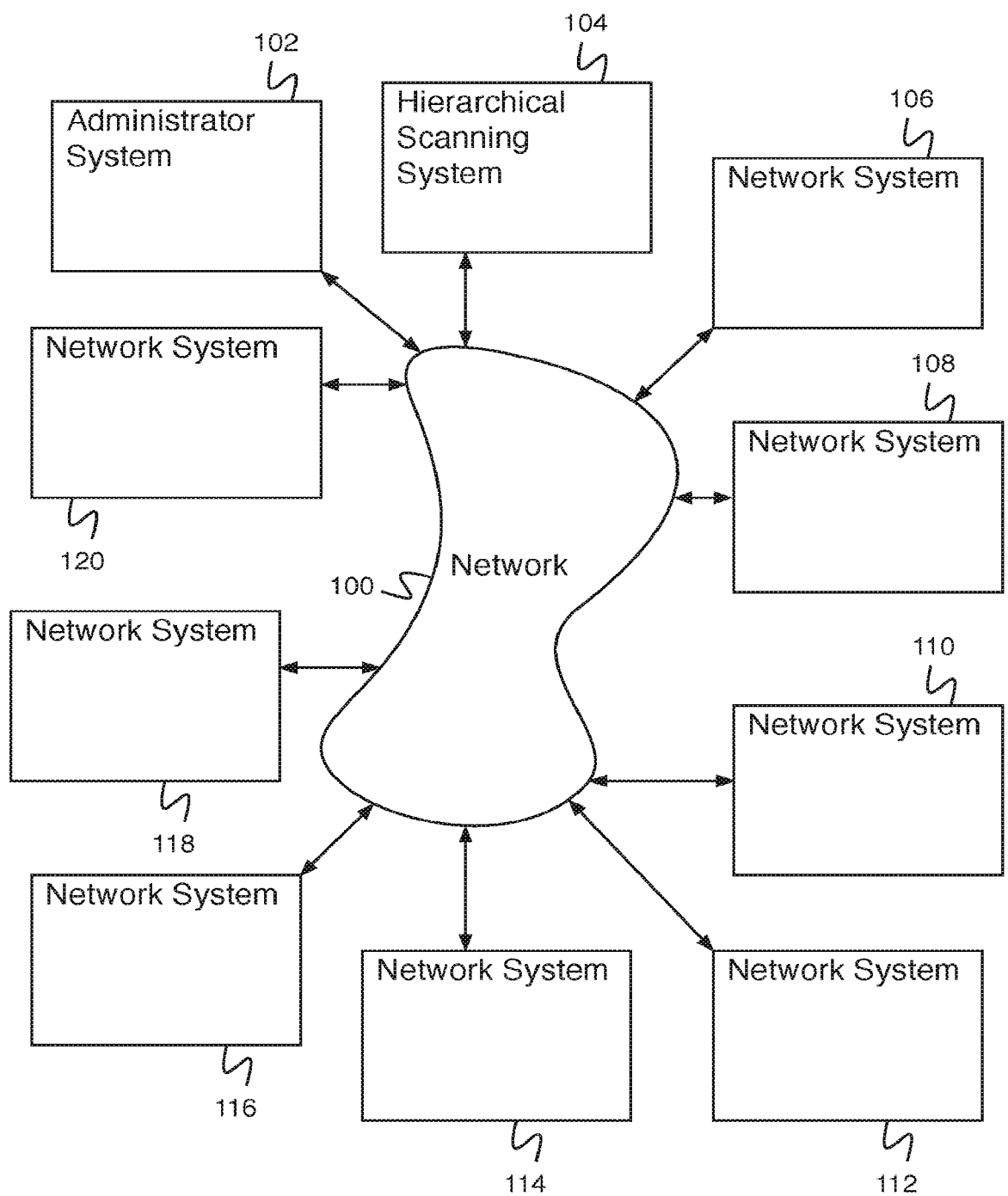
FIG. 1 is a block diagram illustrating an embodiment of a network system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for hierarchical scanning comprises an interface to receive an indication to scan using a payload, provide the payload to a set of addresses on a set of ports, and receive a set of responses, wherein each response is associated with an address and a port; and a processor to: for each response of the set of responses, determine whether there exists a follow-up probe associated with the response, and in the event the follow-up probe exists associated with the response: execute the follow-up probe on the address and the port associated with the response, and store the set of data received in response to the follow-up probe in a database.

In some embodiments, a system for hierarchical scanning comprises a system for scanning network devices connected to a network (e.g., the Internet). Hierarchical scanning of a network includes probing for information and then using the information to probe more. This cycle can be performed multiple times to extract as much information from the network as is possible or as is desired. The information discovered regarding the network is then stored in a database. The hierarchical scanning is used to catalog information regarding the network (e.g., the internet). In some embodiments, a system for hierarchical scanning comprises a system for building a database of network devices and settings. The system for hierarchical scanning provides a data payload to a set of Internet addresses (e.g., every port on every IPv4 address) and receives a set of responses. In various embodiments, when a device connected to the Internet receives the payload, it provides no response, it provides a response indicating that the port is alive, it provides a response indicating a protocol associated with the port, it provides a response indicating that the device is configured not to communicate on the port, or it provides any other appropriate response. For each response received by the system for hierarchical scanning, it is determined whether there is a follow-up probe associated with the response (e.g., whether the system for hierarchical scanning comprises an algorithm for determining more information about the responding device associated with the response). In various embodiments, the follow-up probe is based at least in part on one or more of: the response, the address the response is received from, the port the response is received from, the address that received the payload (e.g., provoking the response), the port that received the payload (e.g., provoking the response), or any other appropriate information. In the event there is a follow-up probe associated with the response, the follow-up probe is executed. In various embodiments, executing the follow-up probe comprises one or more of: delivering further payloads to the responding device, interacting with the device to establish an encrypted connection, requesting data from the responding device, or interacting with the device in any other appropriate way. When the follow-up probe is completed, information received from the device is stored in a device database. The system for hierarchical scanning reduces the amount of time necessary to scan a network by a large factor compared with the worst case by providing only the initial payload to a broad swath of devices and determining from the response whether more in-depth querying is likely to produce useful information. Attempting to execute each follow-up probe on each port of each address would be completely prohibitive for large networks. A device database built using hierarchical scanning comprises information about devices, software, and settings for every port and address for a network, allowing the database to be queried for individual devices or settings of interest. For instance, in the event a compromise to a well-known encrypted communications scheme is discovered after the scheme was previously thought secure, the database can be queried for devices that support that scheme, and a systems administrator informed to fix the devices before the network is compromised.

FIG. 1 is a block diagram illustrating an embodiment of a network system. In some embodiments, the network system of FIG. 1 comprises a system for hierarchical scanning of Internet connected assets. In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. Administrator system 102 and hierarchical scanning system 104 communicate via network 100. Administrator system 102 comprises a system for an administrator. In various embodiments, administrator system 102 comprises a system for an administrator to access applications on an application system, to access data on a database system, to indicate to hierarchical scanning system 104 to perform a scan, to receive data from hierarchical scanning system 104, to configure a network system (e.g., network system 106), to receive data from a network system, or for any other appropriate purpose. In some embodiments, administrator system 102 comprises a processor and a memory.

Hierarchical scanning system 104 comprises a system for scanning network systems. In some embodiments, hierarchical scanning system 104 comprises a system for scanning network systems in response to a command from administrator system 102. In some embodiments, hierarchical scanning system 104 comprises a system for scanning a set of network systems (e.g. network system 106, network system 108, network system 110, network system 112, network system 114, network system 116, network system 118, and network system 120). In some embodiments, scanning a network system comprises providing a payload to the network system and determining whether a response is received. In some embodiments, scanning a network system comprises scanning the network system using a follow-up probe based at least in part on a received response. In some embodiments, the system for hierarchical scanning comprises a system for providing a payload to all accessible network systems on all accessible ports and following up with an appropriate follow-up probe for any received responses that indicate more information is accessible. In some embodiments, hierarchical scanning system 104 comprises a processor and a memory. Each network system of FIG. 1 (e.g., network system 106) comprises an Internet connected system (e.g., a desktop computer, a laptop computer, a smartphone, a tablet computer, a server system, an internet-of-things device, etc.). In various embodiments, the system of FIG. 1 comprises 8, 13, 197, 2222, one million, one hundred million, or any other appropriate number of network systems.

Figure 2:
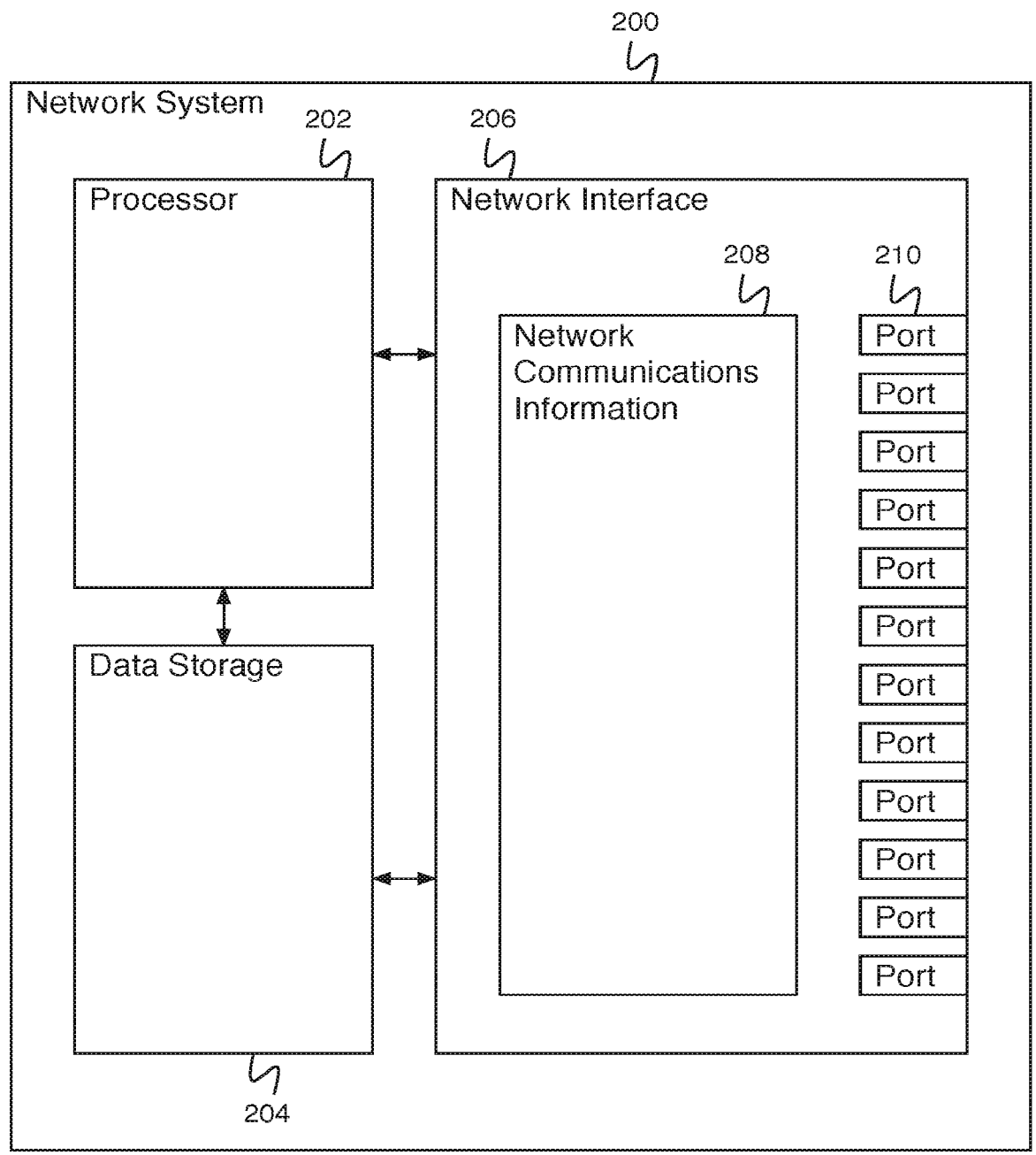
FIG. 2 is a block diagram illustrating an embodiment of a network system.

FIG. 2 is a block diagram illustrating an embodiment of a network system. In some embodiments, network system 200 comprises a network system of FIG. 1 (e.g., network system 106). In the example shown, network system 200 comprises processor 202, data storage 204, and network interface 206. In some embodiments, network system 200 comprises an Internet connected asset (e.g., a desktop computer, a laptop computer, a smartphone, a tablet computer, a server system, an internet-of-things device, or any other appropriate Internet connected asset). In various embodiments, processor 202 comprises a processor for executing instructions, processing data, responding to commands, etc. In various embodiments, processor 202 comprises a general-purpose processor, a microcontroller, a parallel processing system, a cluster of processors, or any other appropriate processor. In various embodiments, data storage 204 comprises a data storage for storing data, for storing instructions for processor 202, for storing configuration information, or for storing any other appropriate information. In various embodiments, data storage 204 comprises one or more of a volatile memory, a non-volatile memory, a magnetic memory, an optical memory, a phase-change memory, a semiconductor memory, a disc memory, a tape memory, or any other appropriate memory. Network interface 206 comprises a network interface for communicating with a network. In the example shown, network interface 206 comprises network communications information 208 and a plurality of ports (e.g., port 210). In various embodiments, network communications information comprises network communications software, network communications settings, network communications data, or any other appropriate network communications information. The plurality of ports comprises physical ports (e.g., plugs for connecting cables to network system 200) or virtual ports (e.g., virtual communications channels identified by a virtual port number). In some embodiments, network interface 206 comprises a network address (e.g., a network address assigned by an external network addressing authority). In some embodiments, communication with network system 200 is specified by indicating the network address of network 200 along with a port number. In some embodiments, some ports of network interface 206 are configured for communication and some are configured to not respond to communication. In some embodiments, some ports are associated with one or more specific communications protocols (e.g., hypertext transmission protocol (HTTP), file transfer protocol (FTP), secure shell (SSH), etc.). In some embodiments, network interface 206 comprises a set of network hardware (e.g., a modem) running a set of communications software that has been configured according to a set of communications specifications.

Figure 3:
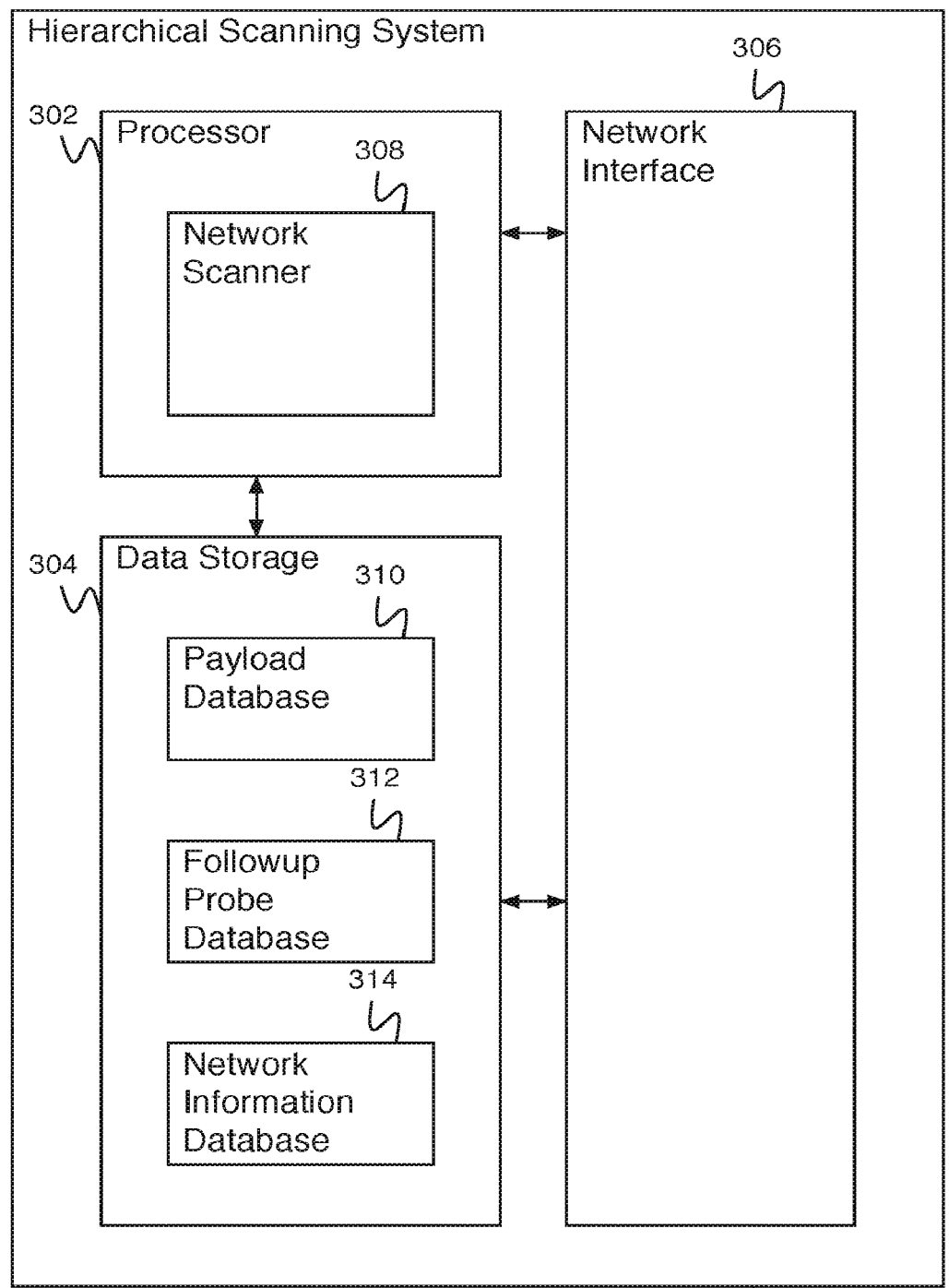
FIG. 3 is a block diagram illustrating an embodiment of a hierarchical scanning system.

FIG. 3 is a block diagram illustrating an embodiment of a hierarchical scanning system. In some embodiments, hierarchical scanning system 300 comprises hierarchical scanning system 104 of FIG. 1. In some embodiments, hierarchical scanning system 300 comprises a server system. In the example shown, hierarchical scanning system 300 comprises processor 302, data storage 304, and network interface 306. In various embodiments, processor 302 comprises a processor for executing instructions, processing data, responding to commands, etc. In various embodiments, processor 302 comprises a general-purpose processor, a microcontroller, a parallel processing system, a cluster of processors, or any other appropriate processor. In some embodiments, processor 302 comprises network scanner 308. In various embodiments, network scanner 308 comprises software and/or hardware implementing hierarchical scanning system functionality. In various embodiments, data storage 304 comprises a data storage for storing data, for storing instructions for processor 302, for storing configuration information, or for storing any other appropriate information. In various embodiments, data storage 304 comprises one or more of a volatile memory, a non-volatile memory, a magnetic memory, an optical memory, a phase-change memory, a semiconductor memory, a disc memory, a tape memory, or any other appropriate memory. In the example shown, data storage 304 comprises payload database 310 for storing payloads for providing to network devices. In some embodiments, a payload comprises a small data packet for probing a network device in order to elicit a response. Data storage 304 additionally comprises follow-up probe database 312 for storing follow-up probes for interacting with network devices. In some embodiments, a follow-up probe comprises software for interacting with a network device in order to determine information about the network device. In some embodiments, follow-up probe database 312 comprises a set of follow-up probes, each designed to interact with a network device in a specific way to retrieve data about the network device (e.g., establish a secure HTTP (HTTPS) connection and download an encrypted web page). In some embodiments, a follow-up probe is used to interact with a network device once it is determined that the follow-up probe is likely to succeed in receiving data from the network device. Data storage 304 additionally comprises network information database 314 for storing network information received as a result of interacting with network devices (e.g., using a payload or a follow-up probe). In some embodiments, network information is stored remotely (e.g., on a storage server, on a different hierarchical scanning system, on cloud storage, etc.). In the example shown, network interface 306 comprises a network interface for interacting with remote systems via a network. In various embodiments, network interface 306 comprises a network interface for providing a payload, for executing communications for a follow-up probe, for receiving network information, or for any other appropriate purpose. In some embodiments, network interface 306 comprises a network interface configured for high bandwidth communication.

Figure 4:
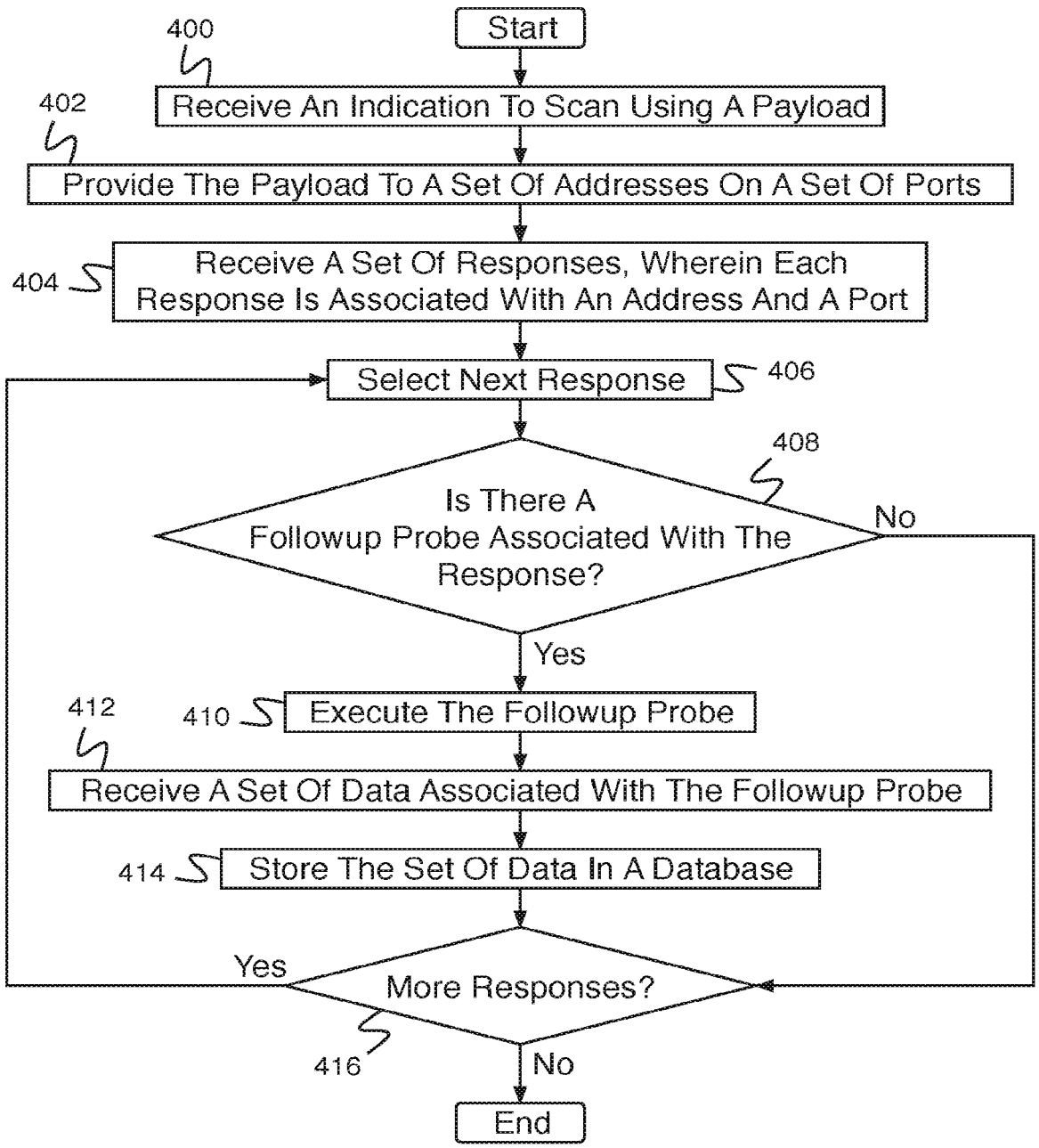
FIG. 4 is a flow diagram illustrating an embodiment of a process for hierarchical scanning.

FIG. 4 is a flow diagram illustrating an embodiment of a process for hierarchical scanning. In some embodiments, the process of FIG. 4 is executed by hierarchical scanning system 104 of FIG. 1. In the example shown, in 400, an indication to scan using a payload is received. In some embodiments, the indication is received from an administrator system. In some embodiments, the payload comprises a payload of a set of payloads stored in a payload storage. In various embodiments, different payloads are capable of scanning different device types, scanning different networks, scanning for different information, or are different in any other appropriate way. In some embodiments, the indication comprises an indication of a set of addresses to scan. In some embodiments, the addresses comprise all addresses (e.g., all internet protocol version 4 (IPv4) address, all internet protocol version 6 (IPv6) addresses, etc.). In some embodiments, the addresses comprise the addresses of a network of interest. In some embodiments, the indication comprises an indication of a set of ports at each address to scan. In some embodiments, the set of ports comprises all ports. In some embodiments, the set of ports comprises one or more ports determined to be associated with a service of interest. In some embodiments, the indication comprises an indication of a follow-up probe of interest (e.g., the indication comprises an indication to scan for information that can be gathered using the follow-up probe of interest). In 402, the payload is provided to a set of addresses on a set of ports. In various embodiments, the payload comprises one or more of the following: a request for capabilities, a hello packet, a heartbeat packet request, a probing request, a request for any response, an existence response, or any other appropriate payload. In various embodiments, the payload comprises a user datagram protocol (UDP) packet (e.g., a wildcard netBios name request), a session initiation protocol (SIP) options request, a universal plug and play (UPNP) discovery message, a simple network management protocol (SNMP) community string, or any other appropriate payload. In 404, a set of responses is received, wherein each response is associated with an address and a port. In some embodiments, the address and port associated with a response comprise the address and port to which the payload was sent provoking the response. In some embodiments, not all addresses and ports provide a response when provoked with the payload. In 406, the next response (e.g., of the set of responses) is selected. In some embodiments, the next response comprises the first response. In 408, it is determined whether there is a follow-up probe associated with the response. In some embodiments, only a subset of all follow-up probes is considered (e.g., the scan is only for information that can be gathered using a predetermined follow-up probe). In the event it is determined that there is not a follow-up probe associated with the response, control passes to 416. In the event it is determined that there is a follow-up probe associated with the response, control passes to 410. In 410, the follow-up probe (e.g., the follow-up probe associated with the response) is executed. In various embodiments, executing the follow-up probe comprises providing a follow-up payload and receiving a response, establishing an unencrypted connection, requesting unencrypted data, establishing an encrypted connection, requesting encrypted data, determining other addresses or ports to probe, or executing any other appropriate follow-up probe. In various embodiments, an unencrypted connection comprises a hypertext transfer protocol (HTTP) connection, a file transfer protocol (FTP) connection, a Modbus connection, a simple mail transfer protocol (SMTP) connection, a Telnet connection, or any other appropriate connection. In some embodiments, the follow-up probe uses an industrial system protocol for communications for systems/devices connected to the network (e.g., a probe asking who are you? using a protocol). In various embodiments, an unencrypted connection uses one of the following protocols: Windriver debug remote procedure call (WDBRPC), building automation and control networks (BacNet), EtherNet, EtherNet/IP, distributed network protocol (DNP3), Niagara Fox, General Equipment service request transport protocol (GE-SRTP), highway addressable remote transducer over internet protocol (HART-IP), ProConOS..TM., Siemens S7, PCWorx, or any other appropriate protocol. In various embodiments, an encrypted connection comprises a hypertext transfer protocol secure (HTTPS) connection, a file transfer protocol secure (FTPS) connection, a secure shell file transfer protocol (SFTP) connection, a secure shell (SSH) connection, a simple mail transfer protocol secure (SMTPS) connection, or any other appropriate connection. In various embodiments, the follow-up probe comprises a follow-up probe for collecting universal plug and play (UPNP) information, for collection network basic input/output system (NetBIOS) information, for collecting domain name server (DNS) information, or for collecting any other appropriate information. In 412, a set of data associated with the follow-up probe is received. In 414, the set of data is stored in a database (e.g., a database on the hierarchical scanning system, a database in the cloud, etc.). In 416, it is determined whether there are more responses (e.g., of the set of responses). In the event it is determined that there are more responses, control passes to 406. In the event it is determined that there are not more responses, the process ends.

Figure 5:
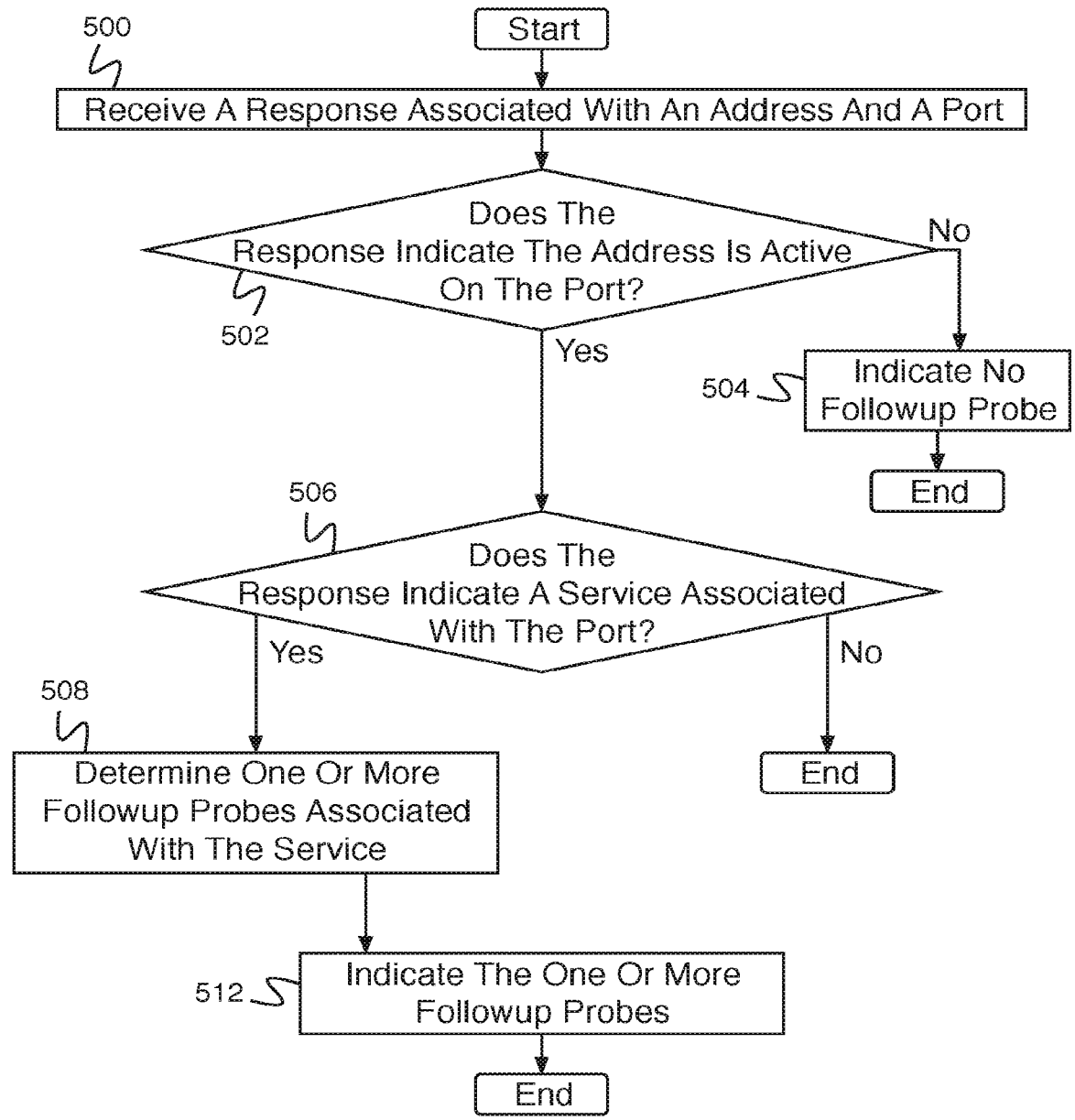
FIG. 5 is a flow diagram illustrating an embodiment of a process for determining whether there is a follow-up probe associated with a response.

FIG. 5 is a flow diagram illustrating an embodiment of a process for determining whether there is a follow-up probe associated with a response. In some embodiments, the process of FIG. 5 implements 408 of FIG. 4. In the example shown, in 500, a response associated with an address and a port is received. In 502, it is determined whether the response indicates the address is active on the port. In the event it is determined that the response indicates the address is active on the port, control passes to 506. In the event it is determined that the response indicates the address is not active on the port, control passes to 504. In 504, the process indicates that there is no follow-up probe, and the process ends. In 506, it is determined whether the response indicates a service associated with the port. In some embodiments, determining whether the response indicates a service associated with the port comprises examining the response for an indication of a service. In the event it is determined that the response indicates a service associated with the port, control passes to 508. In 508, one or more follow-up probes associated with the service are determined. In some embodiments, the one or more follow-up probes are determined by looking up the service in a follow-up probe table. Control then passes to 512. In the event it is determined in 506 that the response does not indicate a service associated with the port, the process ends.

Figure 6:
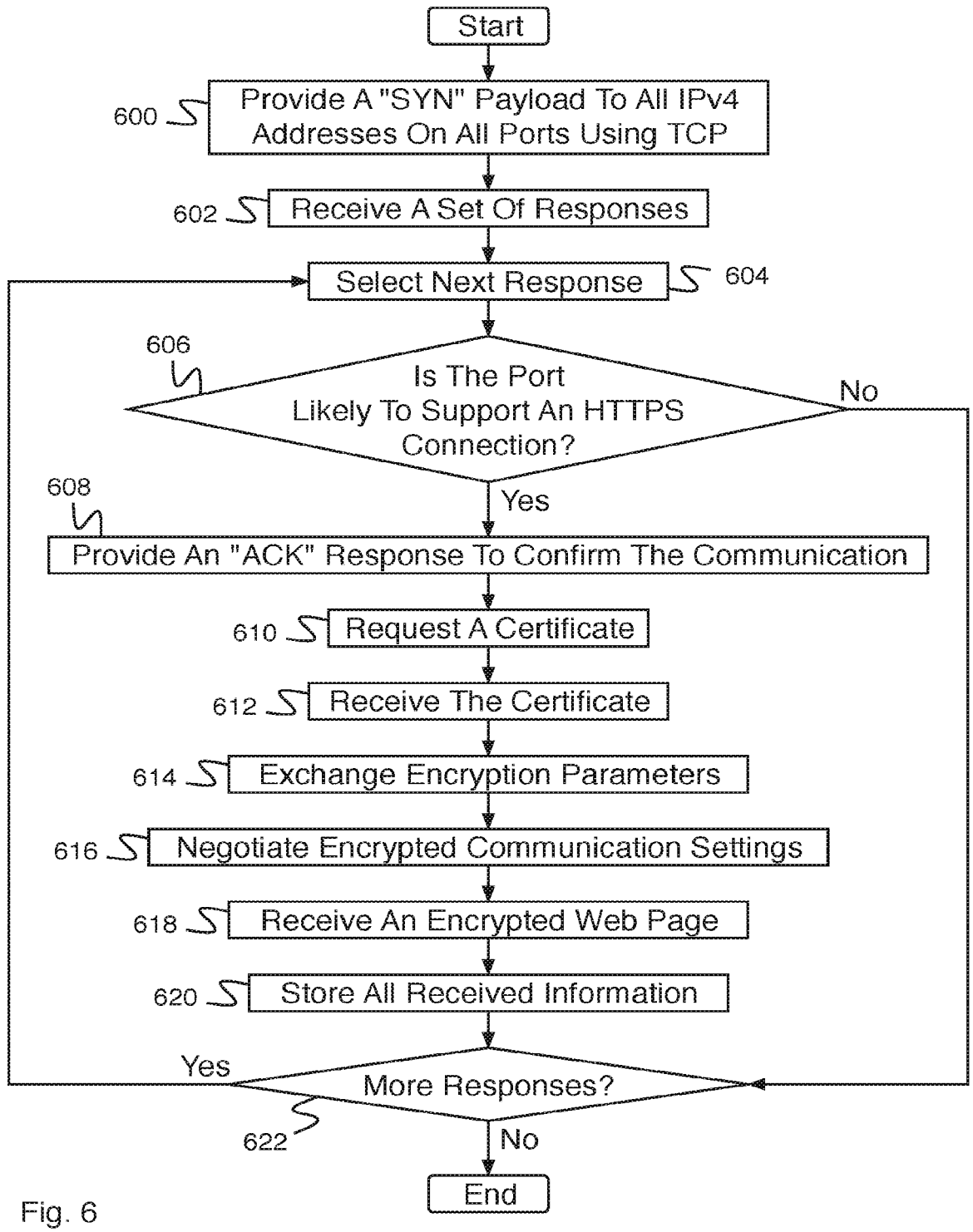
FIG. 6 is a flow diagram illustrating an embodiment of a process for scanning for secure hypertext transfer protocol (HTTPS) connections.

FIG. 6 is a flow diagram illustrating an embodiment of a process for scanning for secure hypertext transfer protocol (HTTPS) connections. In some embodiments, the process of FIG. 6 comprises an implementation of the process of FIG. 4. In the example shown, in 600, a "SYN" payload is provided to all IPv4 addresses on all ports using transfer control protocol (TCP). In 602, a set of responses is received. In some embodiments, positive responses to a "SYN" payload (e.g., indicating that the port supports communication) comprise an "ACK" packet. In 604, the next response (e.g., of the set of responses) is selected. In some embodiments, the next response comprises the first response. In some embodiments, the selected response is associated with a port on an address. In 606, it is determined whether the port (e.g., the port on the address associated with the selected response) is likely to support an HTTPS connection. In some embodiments, other tests for other connection types (e.g., FTPS, SFTP, FTP, HTTP, SSH, etc.) are also performed. In some embodiments, the process determines whether the port is likely to support an HTTPS connection based at least in part on a port/protocol table (e.g., a table of likely protocols supported by each port). In the event it is determined that the port is not likely to support an HTTPS connection, control passes to 622. In the event it is determined that the port is likely to support an HTTPS connection, control passes to 608. In 608, a "SYN-ACK" response is provided (e.g., to the port on the address) to confirm the communication. In 610, a certificate is requested. In some embodiments, a certificate comprises a certificate authenticating the network device or service at the address. In some embodiments, a certificate comprises a certificate that is digitally signed by a trusted authority. In 612, the certificate is received. In some embodiments, the certificate is analyzed for authenticity. In some embodiments, in the event that the certificate fails authenticity analysis, then an indication is stored that the certificate fails. In 614, encryption parameters are exchanged. In some embodiments, encryption parameters comprise Diffie-Hellman encryption parameters. In 616, encrypted communication settings are negotiated. In some embodiments, negotiating encrypted communication settings comprises agreeing on a set of communication settings (e.g., that both the hierarchical scanning system and the network system are configured to use to communicate). In some embodiments, the hierarchical scanning system requests to communicate with the network system using all known communication settings in order to determine which communication settings the network system is configured to use. In 618, an encrypted web page is received. In 620, all received information (e.g., the address, the port, the certificate, the encryption parameters, the encrypted communication settings supported by the network system, the encrypted web page) is stored. In 622, it is determined whether there are more responses (e.g., of the set of responses). In the event it is determined that there are more responses, control passes to 604. In the event it is determined that there are not more responses, the process ends.

Figure 7:
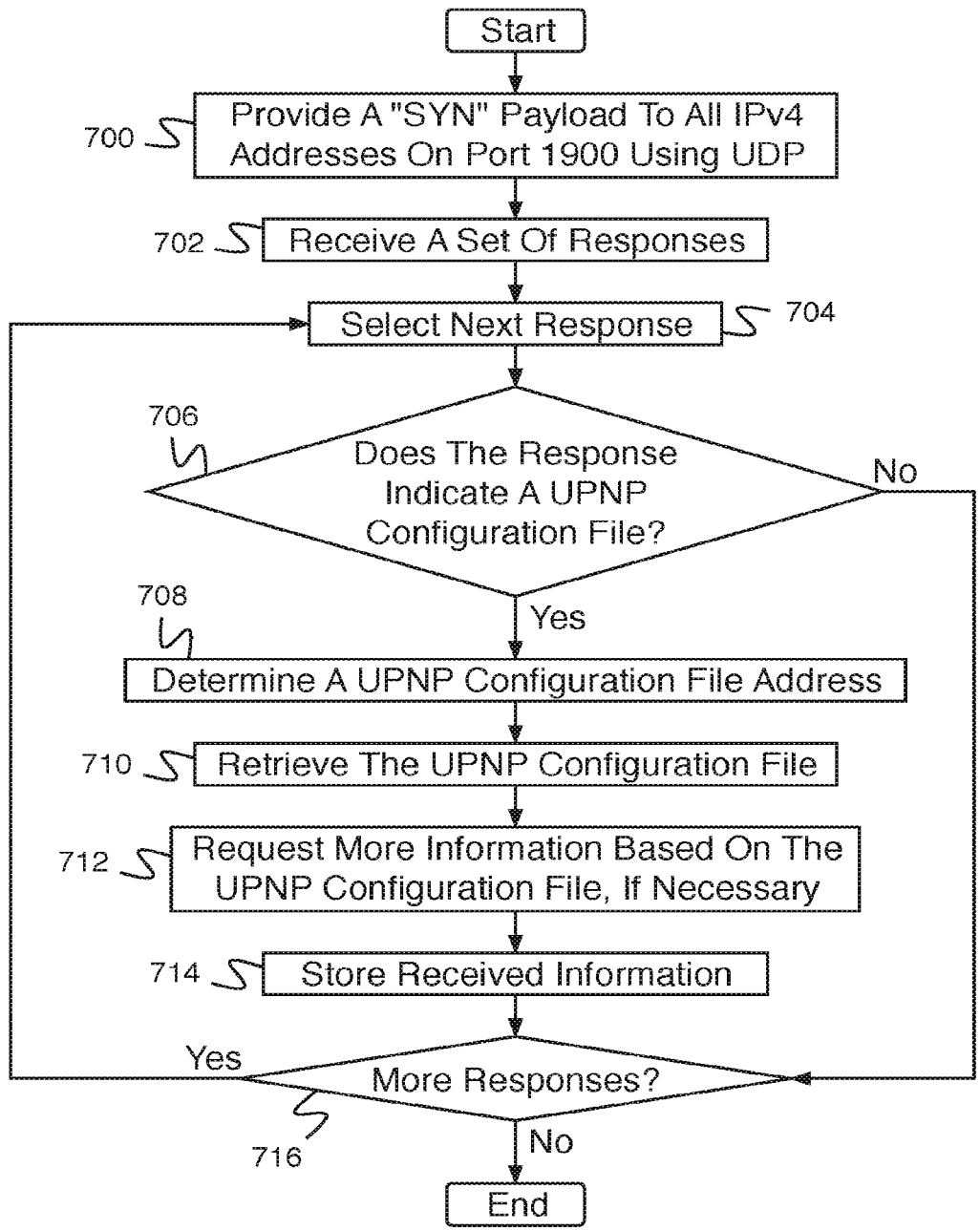
FIG. 7 is a flow diagram illustrating an embodiment of a process for scanning for universal plug and play (UPNP) information.

FIG. 7 is a flow diagram illustrating an embodiment of a process for scanning for universal plug and play (UPNP) information. In some embodiments, the process of FIG. 7 comprises an implementation of the process of FIG. 4. In the example shown, in 700, a UPNP discovery message is provided to all IPv4 addresses on port 1900 using user datagram protocol (UDP). In 702, a set of responses is received. In some embodiments, each response of the set of responses is associated with an address. In 704, the next response (e.g., of the set of responses) is received. In 706, it is determined whether the response indicates a UPNP configuration file. In some embodiments, a response indicating a UPNP configuration file follows a specific format and can be directly identified. In the event it is determined that the process does not indicate a UPNP configuration file, control passes to 716. In the event it is determined that the process indicates a UPNP configuration file, control passes to 708. In 708, a UPNP configuration file address is determined. In some embodiments, the UPNP configuration file address is determined directly from the response. In some embodiments, the UPNP configuration file address is determined based at least in part on the response and the address associated with the response (e.g., the response indicates a local path that is combined with the address associated with the response to determine the configuration file address). In 710, the UPNP configuration file is retrieved. In 712, more information is requested based on the UPNP configuration file, if necessary. In some embodiments, the UPNP configuration file indicates the presence of hardware, software, or configurations that correspond to further queries or follow-up probes. In 714, received information is stored. In 716, it is determined whether there are more responses (e.g., of the set of responses). In the event it is determined that there are more responses, control passes to 704. In the event it is determined that there are not more responses, the process ends.

Figure 8:
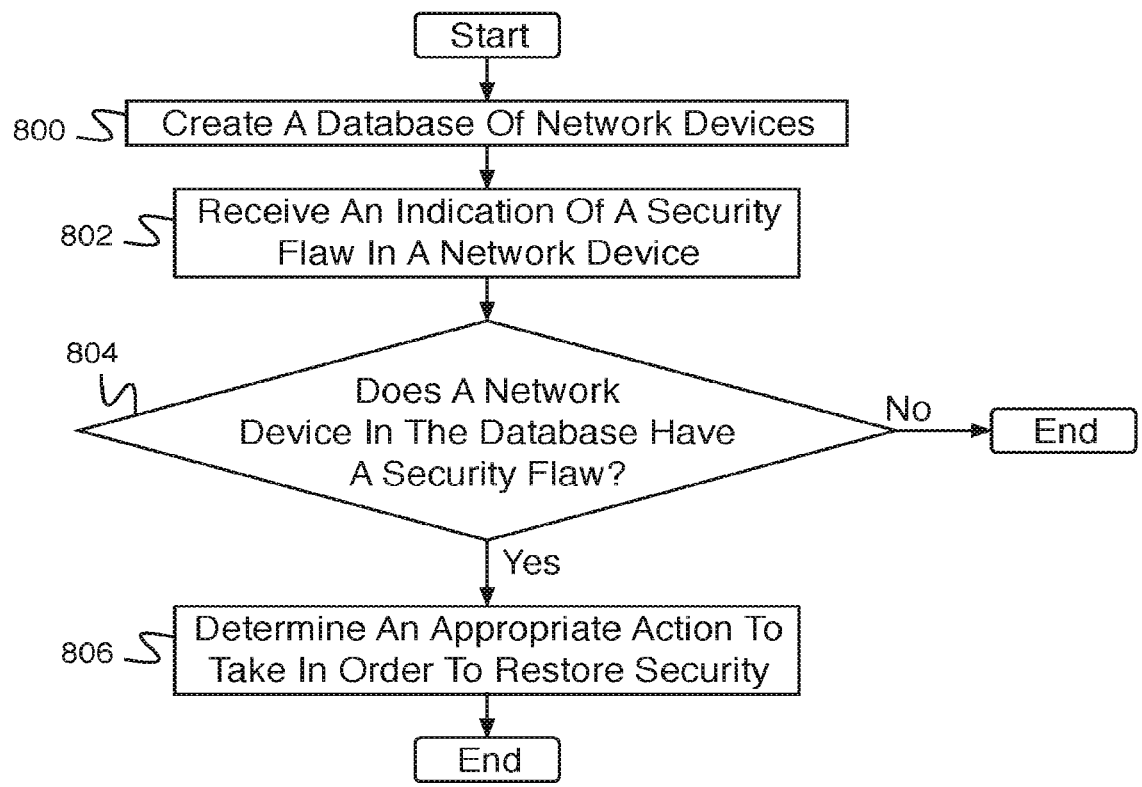
FIG. 8 is a flow diagram illustrating an embodiment of a process for maintaining security.

FIG. 8 is a flow diagram illustrating an embodiment of a process for maintaining security. In some embodiments, the process of FIG. 8 is executed by an administrator using an administrator system (e.g., administrator system 102 of FIG. 1). In the example shown, in 800, a database of network devices is created. In some embodiments, a database of network devices comprises a database of network hardware, network software, and network configurations. In some embodiments, a database of network devices is created using the process of FIG. 4. In 802, an indication of a security flaw in a network device is received. In various embodiments, an indication of a security flaw in a network device is received from a network device, from a security protection company, from the news media, from a trusted source, or from any other location. In 804, it is determined whether a network device in the database has a security flaw. In some embodiments, determining whether a device in the database has a security flaw comprises determining whether a network device in the database of network devices matches the network device indicated in 802. In the event it is determined that a network device in the database does not have a security flaw, the process ends. In the event it is determined that a network device in the database has a security flaw, control passes to 806. In 806, an appropriate action to take in order to restore security is determined. In various embodiments, an appropriate action to take in order to restore security comprises disconnecting the network device, changing the configuration of the network device, updating the software of the network device, or any other appropriate action to restore security.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method comprising:
communicating probing payloads to a plurality of ports of a plurality of network addresses to determine publicly accessible devices, wherein said communicating is over the Internet and from a system that is external to one or more networks corresponding to the plurality of network addresses;
based on receiving responses to at least a subset of the probing payloads, determining, for each of the responses that indicates an active port and corresponding one of the plurality of network addresses, a follow-up probe to establish either an encrypted connection or an unencrypted connection depending upon the response;
communicating the follow-up probes to the publicly accessible devices corresponding to the active ports and corresponding network addresses; and
updating a network information database with those of the plurality of network addresses corresponding to the publicly accessible devices and updating the network information database based, at least partly, on the responses to the probing payloads from the publicly accessible devices and responses to the follow-up probes.

2. The method of claim 1, further comprising:
receiving an indication of a security flaw;
searching the network information database for a device corresponding to the indication of the security flaw; and
based on finding a device corresponding to the indication of the security flaw, identifying a security action based on the security flaw and information in the network information database associated with the device.

3. The method of claim 1 further comprising receiving an indication to scan, wherein the indication to scan indicates the plurality of ports and the plurality of network addresses, wherein communicating the probing payload is based on the indication to scan.

4. The method of claim 3, wherein the indication to scan also indicates a service and wherein the communicated probing payloads probe for the service.

5. The method of claim 3 further comprising determining a probing payload to communicate as the probing payloads in a payload database based on the indication to scan, wherein the indication to scan also indicates at least one of device type and information to obtain.

6. The method of claim 1, wherein determining the follow-up probe is also based on looking up the follow-up probe in a table that associates services with follow-up probes.

7. A system comprising:
a processor;
a network interface; and
one or more computer-readable medium having instructions stored thereon, the instructions executable by the processor to cause the system to, communicate, via the network interface, probing payloads to a plurality of ports of a plurality of network addresses to determine publicly accessible devices, wherein the system is external to each network corresponding to the plurality of network addresses;
based on receipt of responses to at least a subset of the probing payloads, determine, for each of the responses that indicates an active port and corresponding one of the plurality of network addresses, a follow-up probe to establish either an encrypted connection or an unencrypted connection depending upon the response;
communicate, via the network interface, the follow-up probes to each of the publicly accessible devices corresponding to the active ports and corresponding network addresses; and
update a network information database with those of the plurality of network addresses corresponding to the publicly accessible devices and update the network information database based, at least partly, on the responses to the probing payloads from the publicly accessible devices and responses to the follow-up probes.

8. The system of claim 7, wherein the system comprises the network information database.

9. The system of claim 7, wherein the computer-readable medium further has instructions executable by the processor to cause the system to:
search the network information database for a device corresponding to an indication of a security flaw; and
based on finding a device corresponding to the indication of the security flaw, identify a security action based on the security flaw and information in the network information database associated with the device.

10. The system of claim 7, wherein the computer-readable medium further has instructions executable by the processor to cause the system to receive an indication to scan via a scanning interface, wherein the indication to scan indicates the plurality of ports and the plurality of network addresses, wherein the instructions to communicate the probing payloads are executed based on the indication to scan.

11. The system of claim 10, wherein the indication to scan also indicates a service and wherein the communicated probing payloads probe for the service.

12. The system of claim 10 wherein the computer-readable medium further has instructions executable by the processor to cause the system to determine a probing payload to communicate as at least some of the probing payloads in a payload database based on the indication to scan, wherein the indication to scan also indicates at least one of device type and information to obtain.

13. The system of claim 7, wherein the one or more computer-readable medium also has stored therein a table that associates services with follow-up probes, wherein the instructions to determine the follow-up probe comprise the instructions executable by the processor to cause the system to look up the service in the table to determine the follow-up probe.

14. A non-transitory computer readable medium having program code stored thereon, the computer program comprising instructions to:
  communicate probing payloads to a plurality of ports of a plurality of network addresses to determine publicly accessible devices;
  based on receipt of responses to at least a subset of the probing payloads, determine for each response that indicates an active port and corresponding one of the plurality of network addresses a follow-up probe to establish either an encrypted connection or an unencrypted connection depending upon the response;
  communicate the follow-up probes to the publicly accessible devices corresponding to the active ports and corresponding ones of the plurality of network addresses; and
  update a network information database with those of the plurality of network addresses corresponding to the publicly accessible devices and update the network information database based, at least partly, on the responses to the probing payloads from the publicly accessible devices and responses to the follow-up probes.

15. The non-transitory computer readable medium of claim 14, wherein the computer program further comprises instructions to receive an indication to scan via a scanning interface, wherein the indication to scan indicates the plurality of ports and the plurality of network addresses.

16. The non-transitory computer readable medium of claim 15, wherein the indication to scan also indicates a service and wherein the communicated probing payloads probe for the service.

17. The non-transitory computer readable medium of claim 15, wherein the computer program further comprises instructions to determine a probing payload to communicate as at least some of the probing payloads in a payload database based on at least one of device type and information to obtain also indicated in the indication to scan.

18. The non-transitory computer readable medium of claim 14 wherein the instructions to determine the follow-up probe comprise instructions to look up a service in a table to determine the follow-up probe for a first of the responses that indicates the service, wherein the table associates services with follow-up probes.

* * * * *